US007099546B2

(12) United States Patent
Andrieu et al.

(10) Patent No.: US 7,099,546 B2
(45) Date of Patent: Aug. 29, 2006

(54) METHOD FOR MAKING A PLASTIC GRADED INDEX OPTICAL FIBER AND RESULTING GRADED INDEX OPTICAL FIBER

(76) Inventors: Xavier Andrieu, 13, rue des Noyers, 91220 Bretigny sur Orge (FR); Bernard Boutevin, 1, rue Anselme Mathieu, 34090 Montpellier (FR); Alain Pastouret, 36, rue de Courdimanche, 91940 Les Ulis (FR); Alain Rousseau, 252 rue D'Epidaure, 34000 Montpellier (FR); Jean-Marc Sage, 8 bis, rue du Petit Revoyet, 69600 Oullins (FR)

( * ) Notice: Subject to any disclaimer, the term of this patent is extended or adjusted under 35 U.S.C. 154(b) by 82 days.

(21) Appl. No.: 10/493,998
(22) PCT Filed: Nov. 18, 2002
(86) PCT No.: PCT/FR02/03931

§ 371 (c)(1),
(2), (4) Date: Oct. 21, 2004

(87) PCT Pub. No.: WO03/043804

PCT Pub. Date: May 30, 2003

(65) Prior Publication Data
US 2005/0069268 A1 Mar. 31, 2005

(30) Foreign Application Priority Data
Nov. 19, 2001 (FR) ................................. 01 15037

(51) Int. Cl.
*G02B 6/028* (2006.01)
*C03B 37/023* (2006.01)
(52) U.S. Cl. .................... 385/124; 385/141; 65/385
(58) Field of Classification Search ............... None
See application file for complete search history.

(56) References Cited

U.S. PATENT DOCUMENTS 4,799,761 A * 1/1989 Yamamoto et al. ......... 385/124
6,185,353 B1 * 2/2001 Yamashita et al. .......... 385/124
6,307,992 B1 * 10/2001 Yamashita et al. .......... 385/124
6,593,415 B1 * 7/2003 Koike et al. ................ 524/520
6,631,233 B1 * 10/2003 Yamashita et al. .......... 385/124
2004/0097676 A1 * 5/2004 Boutevin et al. ............ 526/249
2005/0062180 A1 * 3/2005 Andrieu et al. ............. 264/1.24
2005/0069268 A1 * 3/2005 Andrieu et al. ............. 385/124
2005/0084230 A1 * 4/2005 Pascal et al. ................ 385/147

FOREIGN PATENT DOCUMENTS

| EP | 0710855 | 5/1996 |
| EP | 1067222 | 1/2001 |
| EP | 0990509 | 5/2002 |
| JP | 01265207 | 10/1989 |
| JP | 01265208 | 10/1989 |

* cited by examiner

*Primary Examiner*—Michelle Connelly-Cushwa
(74) *Attorney, Agent, or Firm*—Sofer & Haroun

(57) ABSTRACT

The present invention concerns a method of manufacturing a graded index plastic optical fiber having an index that varies continuously between the center and the periphery of the fiber, from at least one polymer P and at least one reactive diluent D1 to allow the refractive index of said fiber to be varied. Said polymer P is a terpolymer comprising at least three repeating units P1, P2 and P3 with the following general formulae:

Figure 1:
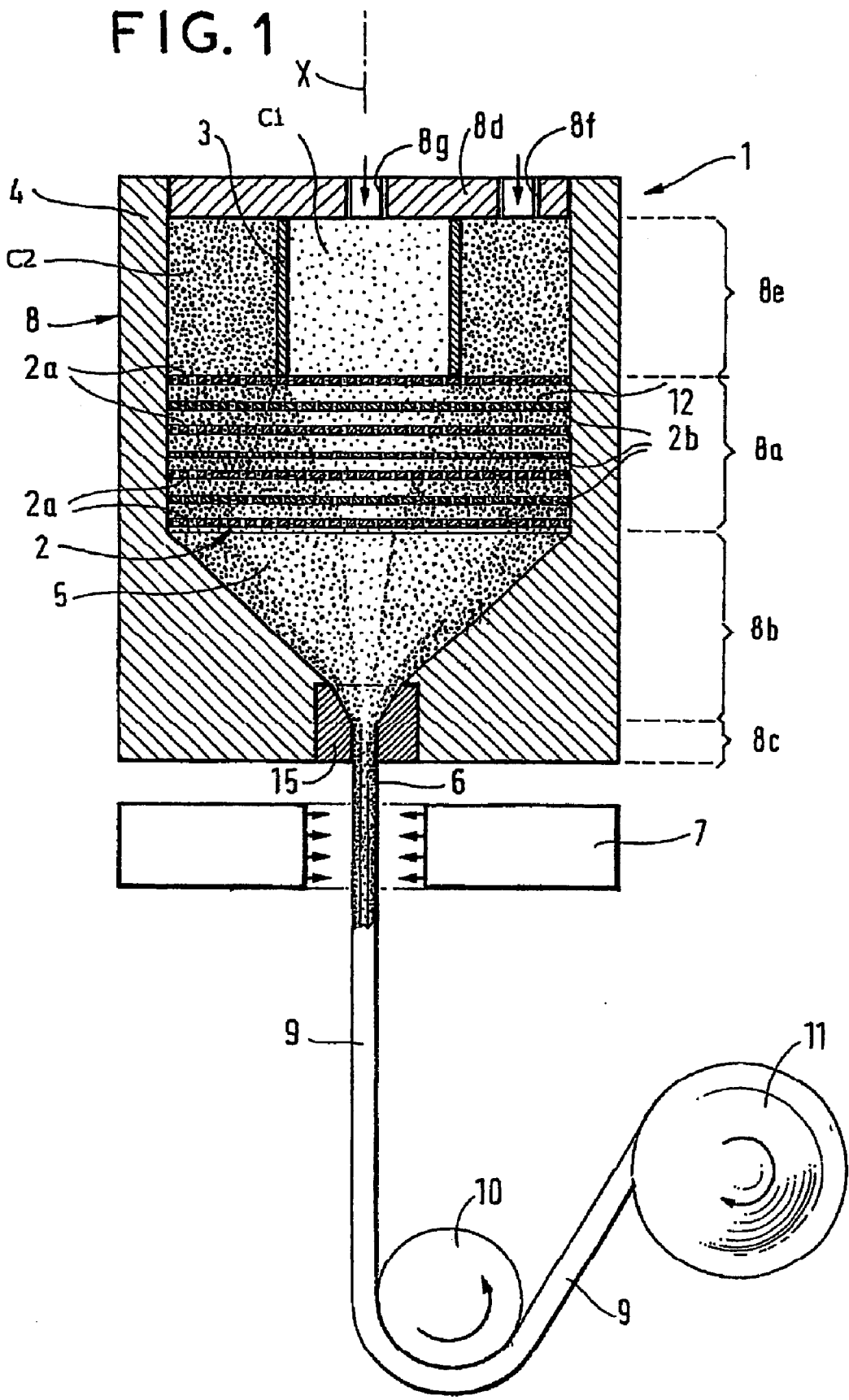

-continued
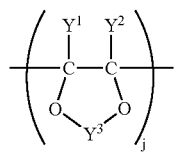
P2
-continued
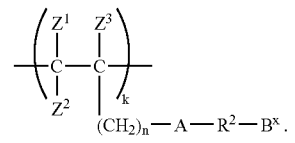
P3
16 Claims, 3 Drawing Sheets

METHOD FOR MAKING A PLASTIC GRADED INDEX OPTICAL FIBER AND RESULTING GRADED INDEX OPTICAL FIBER

RELATED APPLICATION

This application is a National Stage application of PCT Patent Application No. PCT/FR02103931, filed on Nov. 18, 2002, which in turn claims the benefit of priority from French Patent Application No. 0115037, filed on Nov. 19, 2001, the entirety of which are incorporated herein by reference.

The present invention relates to a method of producing a graded index optical fiber and to an optical fiber obtained by said method.

Graded index plastic optical fibers for use in a spectral range encompassing the visible and the near infrared, are advantageous since they can be applied to broadband access networks. A graded index plastic optical fiber comprises at least one base polymer and a further compound, termed the dopant, comprising one or more monomers or polymers. The proportion of base polymer is substantially the same throughout the fiber and the proportion of dopant varies from the core to the periphery of the fiber so as to produce the desired index gradient.

Such plastic optical fibers are difficult to manufacture, since the dopant must be present in a distribution that varies from the core to the periphery of a plastic optical fiber. In fact, the fiber has to have a refractive index profile that is graded in as regular a fashion as possible, with the variation in the refractive index between the center and the periphery of the fiber generally being in the range 0.01 to 0.03.

To manufacture such fibers, European patent EP-A-0 1 067 222 describes a method of manufacturing a graded index plastic optical fiber in which the index varies continuously between the center and the periphery of the fiber.

In that method, the fiber is manufactured from at least one polymer P and at least one reactive diluent D1, which acts as the dopant, allowing its refractive index to be varied.

That method comprises the following steps:
  preparing two compositions with different refractive indices, the difference in refractive index between the two compositions being at least $5 \cdot 10^{-3}$, each comprising at least the polymer P, one of the compositions, termed the first composition, also comprising at least the reactive diluent D1, a radical polymerization initiator being present in at least one of the compositions;
  active mixing of the two compositions to obtain a continuous variation in the index of the optical fiber;
  spinning the mixture;
  curing the mixture to produce a plastic optical fiber with a refractive index gradient.

In accordance with that method, polymer P and reactive diluent D1 are selected such that:
  polymer P has a molar mass in the range 1000 to 20000 g.moles$^{-1}$ and the molar mass of the reactive diluent D1 is in the range 100 to 1000 g.moles$^{-1}$
  the reactive diluent D1 comprises at least one UV-reactive unsaturated group selected from the group formed by vinyl groups and acrylic groups;
  polymer P comprises at least one UV-reactive unsaturated group selected from the group formed by vinyl groups and acrylic groups;
  at least one of the two compounds P and D1 is at least mono-functional, the other of the two compounds P and D1 being at least bifunctional.

The molar masses mentioned above are number average molar masses. This is also the case with all of the molar masses mentioned below.

In the above-mentioned document, a preferred base polymer is of the poly (Δ-fluoro)methacrylate type, and more generally of the PMMA (polymethylmethacrylate) type.

Because of the high absorption of the C—H bonds in that polymer, applications for the fibers obtained from that polymer are limited to visible wavelengths less than 800 nanometers (nm).

Thus, the aim of the present invention is to provide a method of manufacturing a graded index optical fiber for producing plastic optical fibers that can function at wavelengths of greater than 500 nm without causing prohibitive attenuation of the transmitted optical signal.

The present invention thus proposes a method of manufacturing a graded index plastic optical fiber wherein the index varies continuously between the center and periphery of the fiber, from at least one polymer P and at least one reactive diluent D1, to allow the refractive index of said fiber to vary, said method comprising the following steps:
  preparing two compositions with different refractive indices, the difference in refractive index between the two compositions being at least $5 \cdot 10^{-3}$, each comprising at least the polymer P, one of the compositions, termed the first composition, also comprising at least the reactive diluent D1, a radical polymerization initiator being present in at least one of the compositions;
  active mixing of the two compositions to obtain a continuous variation in the refractive index of the optical fiber;
  spinning the mixture;
  curing the mixture to produce a cured plastic optical fiber with a refractive index gradient;

said method being characterized in that said polymer P is a terpolymer comprising at least three repeating units P1, P2 and P3 with the following general formulae:

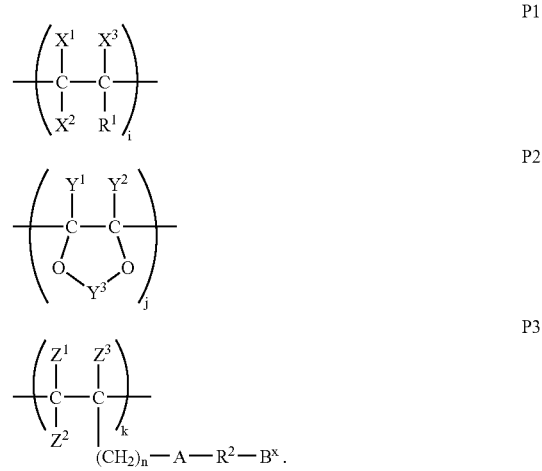

in which:
  $X^1$, $X^2$ and $X^3$, which may be identical or different, are taken from the group of atoms H, F, Cl and Br;
  $R^1$ is a H, F, Cl or Br atom or a carbonaceous group containing 1 to 10 partially or completely fluorinated carbon atoms;

$Y^1$ and $Y^2$, which may be identical or different, are taken either from the group of atoms comprising H, F, Cl and Br, or from the family of carbonaceous groups containing 1 to 10 carbon atoms;

$Y^3$ is a carbonyl group or a divalent carbonaceous group;

$Z^1$, $Z^2$ and $Z^3$, which may be identical or different, are hydrogen or fluorine atoms, or carbonaceous groups containing 1 to 10 carbon atoms;

n equals 0 or 1;

A is an ester function or an oxygen or sulfur atom;

$R^2$ is taken from the group comprising divalent hydrocarbon groups containing 2 to 8 carbon atoms and partially halogenated divalent carbonaceous groups containing 2 to 8 carbon atoms;

$B^x$ is an unsaturated reactive function;

i, j and k correspond to a repeat number of units;

the quantity of P3 units in the terpolymer being in the range 2 mole % to 40 mole %, preferably in the range 10% to 20%, and the mole ratio of the P1/P2 units being in the range 0.5 to 5.5, preferably in the range 1 to 2, said terpolymer being transparent, amorphous in nature and having a glass transition temperature (Tg) of more than 25° C.

Because the known method uses a transparent functional polymer which is amorphous in nature that can be UV or heat cured, soluble in the usual organic solvents, with a glass transition temperature that is higher than ambient temperature and engendering reasonable manufacturing costs compared with the prior art, it is possible to obtain graded index plastic optical fibers having lower attenuation than that of the fibers obtained from prior art PMMA type polymers. That polymer is obtained by radical copolymerization of commercially available monomers that do not require the use of dangerous reagents to transform them.

Introducing an ethylene group into the functional polymer renders it curable at any time by simple photochemical or heat treatment. In particular, curing said functional terpolymer in the presence of a photo-initiator using known methods which have been described in the literature allows optical components such as optical fibers to be prepared.

The terpolymer contains a great deal of fluorine and thus less hydrogen than prior art PMMA type polymers, resulting in increased transparency, and has a cyclic structure, resulting in an amorphous structure and thus in improved optical transmission properties. Thus, the fibers obtained by the method of the invention are particularly suitable for applications at wavelengths longer than 500 nm, typically in transmission windows around 650 nm, 850 nm, 1300 nm, and 1550 nm.

Advantageously, the curing is photo-curing and the initiator is a photo-initiator.

Advantageously, the molar mass of the polymer P is in the range 1000 to 20000 g.moles$^{-1}$ and the molar mass of the reactive diluent D1 is in the range 100 to 1000 g.moles$^{-1}$. These ranges limit the viscosity of the composition and facilitate spinning.

More advantageously, polymer P and the reactive diluent D1 each comprise at least one UV-reactive unsaturated group selected from the group formed by vinyl groups and acrylic groups.

Advantageously, the glass transition temperature of the terpolymer is in the range from about 60° C. to 90° C. when the quantity of P2 motifs in the terpolymer is in the range from about 20 mole % to 50 mole %.

Advantageously also, the molar mass (Mn) of the terpolymer is in the range 500 to $10^5$ g.moles–1, preferably in the range $10^3$ to $10^4$ g.moles–1, and more particularly in the range $2 \upsilon 10^3$ g.moles$^{-1}$ to $5 \upsilon 10^3$ g.moles$^{-1}$.

Preferably, the repeating unit P1 derives from polymerizing a monomer M1 with the following general formula:

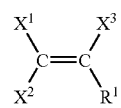

M1

More particularly, M1 can be a fluorinated monomer (fluorinated, perfluorinated or chlorofluorinated ethylene) represented by the general formula $CF_2=CFX$ in which X is either:

a fluorine atom, in which case M1 is tetrafluoroethylene (TFE);

a chlorine atom, in which case M1 is chlorotrifluoroethylene (CTFE).

In an alternative, M1 can also be a compound in which $X^1=X^2=X^3=F$ and $R^1=H$, or a compound in which $X^1=X^2=H$ and $X^2=R^1=F$, or a compound in which $X^1=X^2=X^3=F$ and $R^1=CF_3$.

Further, repeating unit P2 is derived from polymerizing a monomer M2 with a cyclic structure having the following general formula:

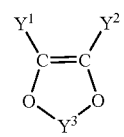

M2

Preferably, M2 can be vinylene carbonate (VCA), in which $Y^3$ is a carbonyl group and $Y^1$ and $Y^2$ are hydrogen atoms.

More generally, M2 can be a compound in which $Y^1=Y^2=F$, or $Y^1=H$ and $Y^2=Cl$, or in which $Y^1=H$, $Y^2=F$ or in which $Y^1=Cl$ and $Y^2=Cl$, $Y^3$ is either a carbonyl group or a divalent carbonaceous group such as: $—CH_2—$, $—CH(CH_3)—$ or $—C(CH_3)_2—$. In a further variation, M2 can also be a compound in which $Y^1=Y^2=F$ and $Y^3$ is $C(CF_3)_2$.

Further, the repeating unit P3 is derived from polymerization followed by chemical transformation of a monomer M3 with the following general formula:

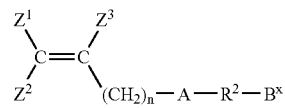

M3

Preferably, A is an ester function such that M3 corresponds to one of two formulae M3' or M3" below, in which R=M3:

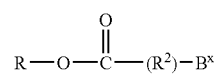

M3'

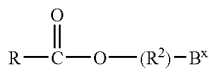

Preferably again, $R^2$ is taken from the group comprising divalent alkyl groups containing 2 to 8 carbon atoms and alkyl groups partially halogenated with F and/or Cl and divalent groups containing 2 to 8 carbon atoms.

More particularly, $B^x$ can equal $B^1$ taken from the group comprising a chlorine, bromine or iodine atom, a hydroxyl function and a hydroxyl function modified by a protective group which may, for example, be a trimethylsilane group or a mesityl group.

More particularly, preferred monomers M3 are those in which $Z^1$, $Z^2$ and $Z^3$ are hydrogen atoms, n=0, A is an oxygen atom, $R^2$ is a linear hydrocarbon chain containing 2 to 4 carbon atoms and $B^1$ is a primary alcohol function or a primary alcohol function modified by a protective group such as the trimethylsilane or mesityl group.

M3 may be ethylene glycol vinyl ether (EGVE) or butanediol vinyl ether (BDVE), or their protected forms.

After radical copolymerization of monomers M1, M2 and M3, the $B^1$ group of the M3 motifs of the terpolymer can be transformed by means of one or more chemical reactions that are known to the skilled person, into a photoreactive group $B^2$ such as —O—CO—CH=$CH_2$, —O—CO—C($CH_3$)=$CH_2$, —O—CO—CF=$CH_2$, —O—CH=$CH_2$ or —O—CH=CH—$CH_3$ (cis and trans), resulting in the production of unit P3.

When $B^1$ is a hydroxyl function, it can be transformed into an acrylic function using conventional organic synthesis techniques starting from acid chlorides or anhydrides, or by transesterification with methyl or ethyl (meth)acrylate, or by direct esterification of the acid by the alcohol $B^1$ with elimination of the water that is formed.

The "active mixing" of the method of the invention is mixing carried out with assistance, i.e. it is not formed solely by diffusion; said active mixing can be produced statically, forcing mixing of the two compositions by a static diffusion means, usually by forced flow, or by a dynamic means which actively produces said mixing. Such a method has the advantage of being rapid, in fact far more rapid than if only diffusion between the compositions were to be employed, to produce a gradient of concentration and thus of refractive index which is continuous and practically smooth.

The curing kinetics are generally such that, under maximum illumination and with complete initiator transformation, the gel time is less than 10 seconds (s), preferably less than 2 s.

In accordance with the method of the invention, spinning the graded index mixture is followed by photochemical or thermal curing resulting in the production of a three-dimensional lattice. This method advantageously at least partially solidifies the components of the plastic optical fiber. The plastic optical fiber obtained and its index gradient is thus stable over time and also stable to temperature. In such a case, in general at least one of the two compositions comprises a monomer; further, at least one of the two compositions comprises at least one radical polymerization initiator, and preferably each of the two compositions comprises at least one radical polymerization initiator. The radical polymerization initiator is a compound which can generate initiator radicals by thermal or photochemical decomposition.

In one implementation, the second composition comprises at least one reactive diluent D2 that also allows its refractive index to be varied, the reactive diluent D2 having a refractive index that is substantially different from the refractive index of D1, having a molar mass in the range 100 to 1000 g.moles$^{-1}$, and comprising at least one UV-reactive unsaturated group selected from the group formed by vinyl groups and acrylic groups.

Preferably, the reactive diluents D1 and D2 have practically identical viscosities and the proportion by weight of polymer P with respect to the constituents of the composition is practically constant for each of the compositions. The method is easier to carry out as the variation in the proportion of reactive diluent(s) D1 and/or D2, principally enabling the refractive index to be modified, does not significantly influence the viscosity of the compositions.

In accordance with one implementation of the method of the invention, the two compositions are mixed at a temperature such that the viscosity at 20° C. of each of the two compositions is in the range 1 pascal-seconds (Pa.s) to 25 Pa.s, preferably in the range 1 Pa.s to 15 Pa.s. This advantageously facilitates implementing the method of the invention, as said viscosity allows relatively fluid compositions to be mixed.

In accordance with one implementation of the method of the invention, spinning is carried out at a temperature such that the viscosity of each of the two compositions is more than 500 mpa.s, preferably more than 1000 mPa.s.

The reactive groups carried by constituents D1 and D2 and polymer P are selected from the group formed by vinyl groups and acrylic groups, i.e. from acrylates, methacrylates, vinyl ethers and propenyl ethers; said compounds may be at least partially halogenated, usually fluorinated and/or chlorinated.

In one implementation of the method of the invention, every component of one of the compositions is an at least partially halogenated material, usually fluorinated and/or chlorinated.

In accordance with a variation of the method of the invention, in the case in which the reactive diluent D2 is present in the second composition, one of the two reactive diluents D1 or D2 is at least partially fluorinated and the other of the two reactive diluents D2 or D1 is at least partially chlorinated or chloro-fluorinated, and thus has a refractive index that is substantially higher than that of the at least partially fluorinated monomer.

The present invention also provides a graded index plastic optical fiber obtained by the method of the invention, and an optical waveguide obtained by the method of the invention.

Other characteristics and advantages of the present invention become apparent from the following description of an implementation of the invention, given by way of non-limiting example.

Figure 2:
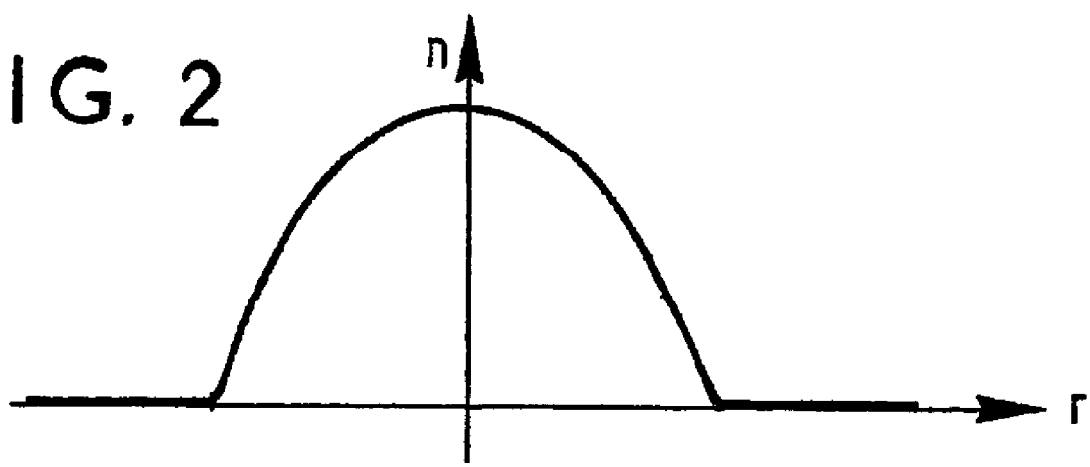
Figure 3:
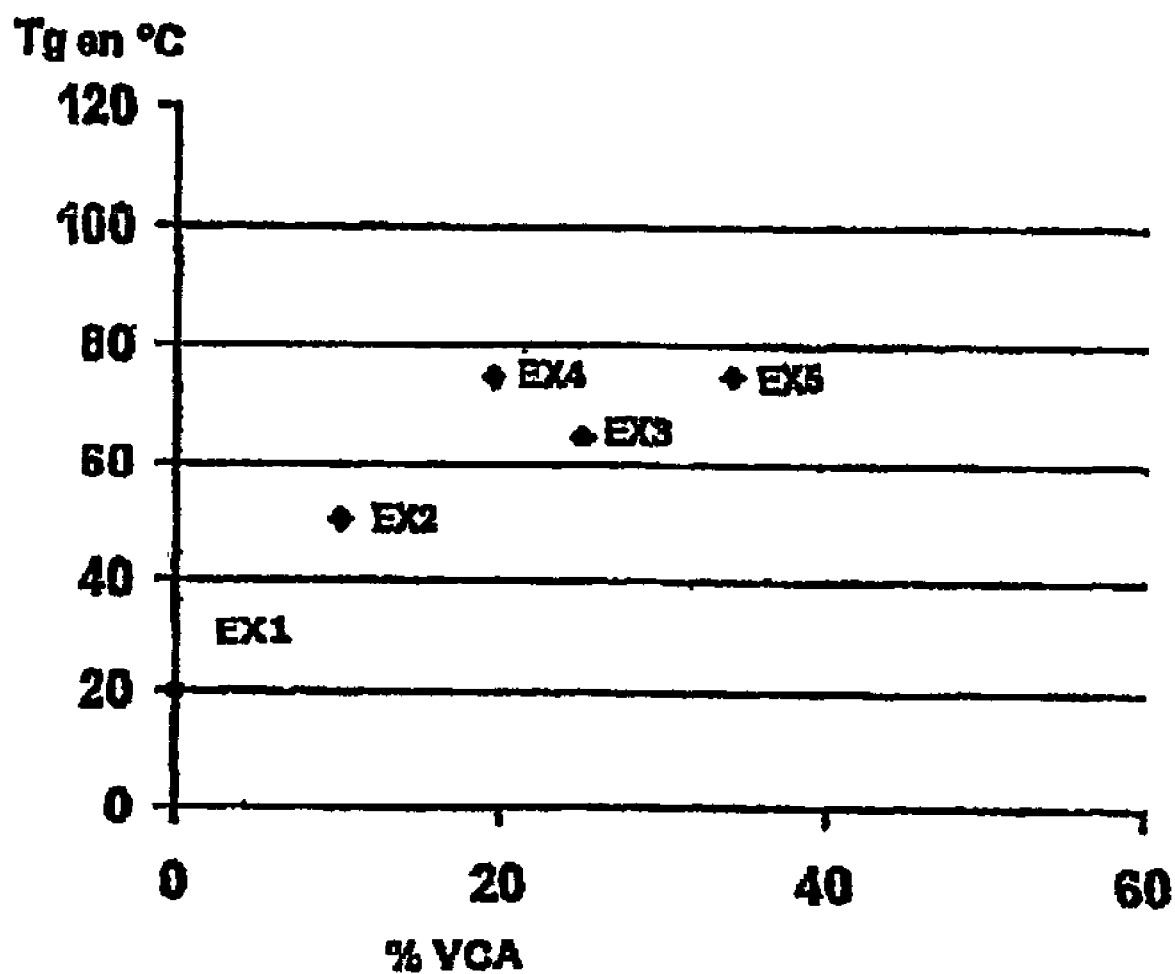

In the following figures:

FIG. 1 diagrammatically represents a device for carrying out the method of the invention;

FIG. 2 diagrammatically represents an index profile for an optical fiber obtained using the device of FIG. 1;

FIG. 3 shows the glass transition temperature Tg as a function of the molar concentration of vinylene carbonate (VCA) in terpolymer P used in the method of the invention.

In all of the figures, the common elements carry the same reference numerals.

In the method of the invention, two compositions are prepared, each comprising a terpolymer P. One of said compositions also comprises at least one reactive diluent D1, which is preferably a monomer. Optionally, the other composition comprises at least one reactive diluent D2, which is preferably also a monomer. The concentration of D1 is different in each of the two compositions, which results in a different refractive index for each composition. The two values obtained for the refractive index constitute the maximum and minimum on the parabolic-shaped graph for the index gradient which is obtained for the plastic optical fiber obtained from the method (see FIG. 2).

The terpolymer P used in the method of the invention is as defined above, i.e. comprising at least three repeating units P1, P2 and P3 with the following general formulae:

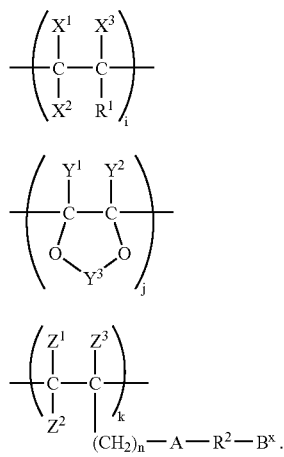

Any known polymerization method of producing polymer P can be employed: solvent polymerization, suspension polymerization or emulsion polymerization in water, for example. Generally, it is preferable to operate in a solvent to control the exothermic nature of the polymerization and encourage intimate mixing of the different monomers. Examples of routinely used solvents that can be cited are: ethyl, methyl or butyl acetate, and chlorinated or chlorofluorinated solvents such as F141b® ($CFCl_2$—$CH_3$) or $CF_3$—$CH_2$—$CF_2$—$CH_3$.

The radical polymerization initiator used can be a free radical generator such as a peroxide, hydroperoxide or percarbonate, or a diazo compound such as azobis-isobutyronitrile (AIBN) or its functionalized derivatives that enable subsequent introduction of an acrylic group at the chain end. When the method is carried out in an aqueous medium, it is possible to use inorganic free radical generators such as persulfates, or redox combinations.

In order to provide better control of the composition of the polymer P, it is also possible to introduce all or part of the monomers and the initiator continuously or in fractions during polymerization. The polymerization temperature is generally dictated by the rate of decomposition of the selected initiator and is generally between 0° C. and 200° C., more particularly between 40° C. and 120° C. The pressure is generally in the range from atmospheric pressure to a pressure of 50 bars, more particularly in the range 2 bars to 20 bars.

The reaction can be carried out in the presence of a stabilizer for the functional monomer M3, provided that it is not prejudicial to the invention. When the monomer formula is as follows: A is an oxygen atom, n=0, $B^1$ is a primary alcohol function, a stabilizer can be used to prevent a secondary reaction in monomer M3, which would cause its degradation. Stabilizers are hydrogeno- or dihydrogenophosphate or bicarbonate type compounds or any other epoxy type compound which could inhibit that secondary reaction. That stabilizer is present in quantities of the order of 0.01 mole % to 10 mole % with respect to the monomer M3. To avoid said secondary reaction in monomer M3, the primary alcohol function $B^1$ can be protected in advance using a trialkylsilyl or mesityl type protective group, using methods that are known in the chemical field.

After polymerizing co-monomers M1, M2 and M3, the primary alcohol function is re-established by treatment with a compound having a labile hydrogen ($H_2O$, $CH_3OH$, for example).

The molar mass of the terpolymer P is managed by controlling the length of the terpolymer chain. The aim of this management is to allow adjustment of the solubility of the terpolymer chain in a solvent or an acrylic or vinyl reactive diluent and to control the final viscosity of said mixture to obtain viscosities that are compatible with the subsequent terpolymer processing method.

To control the chain length of the macro-molecule comprising entities P1, P2 and P3, it is possible, when copolymerizing monomers M1, M2 and M3, to add an agent termed a chain limiter or chain transfer agent the role of which is well known in radical polymerization. The solvent used can also have a chain limiting nature depending on its chemical nature. Examples of chain limiters that are known to the skilled person that can be cited are halogenated derivatives such as $CCl_4$, $CHCl_3$, phosphites such as H—$PO(OEt)_2$, alcohols or ethers having hydrogen atoms on the carbon alpha to the oxygen atom, and esters such as ethyl acetate.

Polymer P of the invention has a molar mass (Mn) in the range 500 to $10^5$ g.moles$^{-1}$, preferably in the range $10^3$ to $10^4$ g.moles$^{-1}$ and more particularly in the range $2\upsilon10^3$ g.moles$^{-1}$ to $5\upsilon10^3$ g.moles$^{-1}$.

The quantity of functional units P3 in the terpolymer comprising units P1, P2 and P3, i.e. the molar percentage expressed as (k/(i+j+k)$\upsilon$100), can vary between 2 mole % and 40 mole %, preferably between 10% and 20%. This quantity determines the degree of curing when processed.

The unit ratio P1/P2, i.e., the ratio (i/j) can be between 0.5 and 5.5, preferably between 1 and 2. Said ratio, and more particularly the quantity of motif P2, influences the glass transition temperature (Tg) of the polymer.

The invention will now be illustrated in the following examples of the production of terpolymer P.

The reagents, initiators and solvents used have the following abbreviations:

| | |
|---|---|
| CTFE: | Chlorotrifluoroethylene $CF_2$=$CFCl$ |
| EGVE: | Ethylene glycol vinyl ether |
| | $CH_2$=CH—O—$CH_2$—$CH_2OH$ |
| EGVE-TMS: | $CH_2$=CH—O—$CH_2$—$CH_2$—O—$Si(CH_3)_3$ |
| BDVE: | Butane diol vinyl ether |
| | $CH_2$=CH—O—$CH_2$—$CH_2$—$CH_2$—$CH_2$—OH |
| VCA: | vinylene carbonate: |

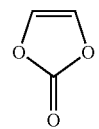

| | |
|---|---|
| TBPP: | Tertiobutyl perpivalate, 75% in isododecane |
| EMHQ: | 4-methoxy-phenol |

-continued

| DAROCUR 1173 ®: | 2-hydroxy-2-methylpropiophenone |
| --- | --- |
| Tg: | Glass transition temperature |
| Mn | Number average molar mass |

The Mn values (number average molar masses) were determined by SEC (steric exclusion chromatography). A "Winner Station" apparatus from Spectra Physics was used. Detection was by refractive index. The column used was a 5 micron mixed C PL gel column from Polymer Laboratories and the solvent used was THF at a flow rate of 0.8 ml/min. The number average molar masses (Mn) are expressed in g.moles$^{-1}$ with respect to a polystyrene standard.

Tg (glass transition temperature) was determined by differential scanning calorimetry (DSC). The temperature was initially raised at 20° C./min followed by cooling, then the temperature was raised a second time during which the Tg or Tf (melting temperature) was read. The temperature range was either −20° C. to 80° C. if Tg was below 60° C. or 50° C. to 200° C. if Tg was greater than 60° C.

The chlorine content was determined conventionally by mineralization in a PARR bomb with $Na_2O_2$, then assaying the chlorides by argentometry.

The hydroxyl functions were assayed using the method described by Bryant et al (J Am Chem Soc Vol 62, 1, 1940) described by Stig Veibel in "The Determination of Hydroxyl Groups", editors R Belcher and D M W Anderson, Academic Press, London and New York, 1972 (pp 86 and 129). The alcohol functions were acetylated using a $BF_3/CH_3COOH$ complex then the water formed was assayed by Karl fisher potentiometric back-titration. The solvent, para-dioxane cited in the method, was replaced by acetonitrile. The results were expressed in milli-equivalents of OH function per gram of polymer (meq/g).

For UV irradiation, a Fusion UV LC-6 conveyer provided with a UV Fusion F3005 treatment system having a 214 W "bulb H" lamp (wavelength 351 nm to 400 nm). The speed of the conveyor corresponded to a 300 millisecond (ms) exposure time to ultraviolet radiation per passage.

COMPARATIVE EXAMPLE 1

M1/M3: CTFE/EGVE

A 160 milliliter (ml) stainless steel reactor was used. Once the reactor had been closed, two or three purges were carried out at 5 bars of nitrogen. The reactor was then evacuated (about 100 mbars) and 50 ml of an ethyl acetate solution containing 0.4 ml of TBPP initiator (1.5 mmoles) and 3.8 g of EGVE (M3; 43 mmoles) was then introduced by aspiration. 5 g of CTFE (M1; 43 mmoles) was then introduced. The reactor was closed and the temperature was raised to 70° C. for 4 hours (h) with stirring; the initial pressure was about 5 bars. After the reaction, the contents of the autoclave were evaporated to obtain a volume of about 10–20 ml, then the reaction mass was precipitated with n-heptane. The precipitated terpolymer was separated then vacuum dried.

2.6 g of a polymer with a pasty appearance and with a Tg of less than 40° C. was obtained.

EXAMPLE 2

CTFE/VCA/EGVE-TMS: M1/M2/M3 in Ethyl Acetate

A 160 ml stainless steel reactor was used. The reactor was closed, then two or three purges were carried out at 5 bars of nitrogen. The reactor was then evacuated (about 100 mbars) and 50 ml of an ethyl acetate solution containing 0.4 ml of TBPP initiator (1.5 mmoles), 2.1 g of EGVE-TMS (M3; 13 mmoles) and 2.6 g of VCA (M2; 30 mmoles) were then introduced by aspiration. 5 g of CTFE (M1; 43 mmoles) was then introduced. The reactor was closed and the temperature was raised to 70° C. for 4 h with stirring; the initial pressure was about 5 bars. After the reaction, the contents of the autoclave were evaporated to obtain a volume of about 10–20 ml and then 50 ml of methanol was added to deprotect the alcohol function of P3. It was stirred for 12 h at ambient temperature, then the reaction mass was evaporated again until a volume of about 20 ml was obtained, and precipitated with n-heptane. The precipitated P1/P2/P3 terpolymer was separated then vacuum dried. 5 g of terpolymer was obtained which was soluble in the usual solvents (acetonitrile, THF).

The analyses for the terpolymer obtained are shown below:

mole ratio of motifs P2/P3, determined by $^1$H NMR=0.20;

Tg: 50° C.;

Mn=7900 g/moles$^{-1}$.

A second experiment similar to that of Example 2 provided a chlorine content measurement of 18.0% with a comparable P2/P3 motif ratio (equal to 0.25), which resulted in an estimated molar composition of motifs P1/P2/P3 for the terpolymer of Example 2 of 52/10/38.

EXAMPLE 3

CTFE/VCA/EGVE-TMS: M1/M2/M3 in Ethyl Acetate

A 160 ml stainless steel reactor was used. The reactor was closed, then two or three purges were carried out at 5 bars of nitrogen. The reactor was then evacuated (about 100 mbars) and 50 ml of an ethyl acetate solution containing 0.4 ml of TBPP initiator (1.5 mmoles), 2.1 g of EGVE-TMS (M3; 13 mmoles) and 5.03 g of VCA (M2; 58 mmoles) was then introduced by aspiration. 7 g of CTFE (M1; 60 mmoles) was then introduced. The temperature was raised to 70° C. for 4 h with stirring; the initial pressure was about 5 bars. After the reaction, the contents of the autoclave were evaporated to obtain a volume of about 10–20 ml and then 50 ml of methanol was added to deprotect the alcohol function of P3. It was stirred for 12 h at ambient temperature, then the reaction mass was evaporated again until a volume of about 20 ml was obtained. It was precipitated with n-heptane. The precipitated P1/P2/P3 terpolymer was separated then vacuum dried. 5 g of terpolymer was obtained which was soluble in the usual solvents (acetonitrile, THF).

The analyses for the terpolymer obtained are shown below:

mole ratio of motifs P2/P3, determined by $^1$H NMR=1;

Tg: 62° C.;

Mn=5700 g/moles$^{-1}$;

[OH]=1.6 meq/g

EXAMPLE 4

CTFE/VCA/EGVE-TMS: M1/M2/M3 in F141b®

The procedure of Example 2 described above was followed, except that the solvent F141b® ($CFCl_2$—$CH_3$) was used in place of ethyl acetate. The quantities employed were 5.23 g of VCA (M2; 61 mmoles), 4.2 g of EGVE-TMS (M3; 26 mmoles), 0.4 ml of TBPP initiator (1.5 mmoles) and 10 g of CTFE (M1; 86 mmoles). 10.3 g of a transparent P1/P2/P3 terpolymer was obtained, which was soluble in acetonitrile.

The analyses for the terpolymer obtained are shown below:
chlorine content: 16.0% by weight;
mole ratio VCA/EVGE (motifs P2/P3) determined by $^1$H NMR=0.83, giving an estimated molar composition of P1/P2/P3 motifs of 45/25/30;
Tg: 74° C.;
[OH]=1.8 meq/g.

EXAMPLE 5

CTFE/VCA/EGVE-TMS: M1/M2/M3 in F141b® with HPO(OEt)$_2$

A 300 ml stainless steel reactor was used. The reactor was closed, then two or three purges were carried out at 5 bars of nitrogen. The reactor was then evacuated (about 100 mbars) and 150 ml of a solution of F141b® containing 1.5 ml of TBPP initiator (5.6 mmoles), 12.6 g of EGVE-TMS (M3; 78 mmoles), 15.6 g of VCA (M2; 182 mmoles) and 7.2 g of diethyl phosphite (52 mmoles) was then introduced by aspiration. 30.5 g of CTFE (M1; 257 mmoles) was then introduced. The reactor was closed and the temperature was raised to 70° C. for 4 h with stirring; the initial pressure was about 10 bars. After the reaction, the contents of the autoclave were evaporated to obtain a volume of about 50 ml and then 100 ml of methanol was added to deprotect the alcohol function of P3. It was stirred for 2 h at ambient temperature, then the reaction mass was evaporated again, taken up in acetone (150 ml) and precipitated by adding water. The precipitated P1/P2/P3 terpolymer was separated then vacuum dried.

46 g of a colorless transparent terpolymer was obtained, which was soluble in the usual solvents (acetone, acetonitrile, THF).

The analyses are shown below:
percentage by weight of chlorine: 17.1%;
mole ratio of motifs P2/P3, determined by $^1$H NMR=2, resulting in an estimated molar composition of motifs P1/P2/P3 of 49/34/17;
Tg: 75° C.;
Mn=4.6υ10$^3$ g.moles$^{-1}$;
[OH]=1.5 meq/g.

The results are shown in Table 1 below.

Comparative Example 10 was a copolymer derived from polymerizing CTFE (M1) and VCA (M2) with a mole ratio P1/P2=1.

TABLE 1

| Example | Mole ratio P2/P3 | Mole ratio P1/P2 | Mn (g · moles$^{-1}$) | Tg (° C.) |
|---|---|---|---|---|
| 1 | 0 | — | — | <40 |
| 2 | 0.2 | 5.2 | 7900 | 50 |
| 3 | 1 | — | 5700 | 62 |
| 4 | 0.8 | 1.8 | — | 74 |
| 5 | 2 | 1.4 | 4600 | 75 |
| 10 | — | 1 | — | 110–120 |

The graph shown in FIG. 3 shows the glass transition temperature (Tg) in ° C. as a function of the % of vinylene carbonate (VCA) incorporated into the terpolymer of the invention. It can be seen that the Tg increases with the % of VCA and that it is in the range from about 60° C. to 90° C. when the quantity of motif P2 is in the range from about 20 mole % to 50 mole %.

EXAMPLE 6

Acrylation of the Primary Alcohol Function of P3 by Acryloyl Chloride 30 g of the polymer prepared in Example 3 was dissolved in 90 ml of dry acetonitrile (water content below 500 ppm) in a 250 ml glass reactor provided with a calcium chloride drying tube. 200 ppm of EMHG was added and 20 g of acryloyl chloride was added dropwise. It was heated to 40° C. for 2 h. 5–10 ml of methanol was then added and the terpolymer was precipitated from water. The terpolymer obtained was dried then re-dissolved in acetonitrile and precipitated again from water. After drying, 25 g of dry terpolymer was obtained.

Infrared analysis showed the appearance of characteristic acrylate bands.

EXAMPLE 7

CTFE/VCA/HBVE: M1/M2/M3 in F141b®

1$^{st}$ Step

A solution composed of the following was introduced into a stainless steel reactor:
6.1 g of VCA (M2; 71 mmoles);
2.8 g of diethylphosphite (20.8 mmoles);
5.7 g of 4-hydroxybutyl vinyl ether (M3; 30.3 mmoles), the alcohol function of which was protected by a trimethylsilane group. The 4-hydroxybutyl vinyl ether had been prepared by reacting vinyl ether with hexamethyldisilazane;
1.5 g of TBPP initiator;
80 ml of solvent F141b®.

12 g of CTFE (M1; 103 mmoles) was then introduced and the system was heated under autogenous pressure to 70° C. for 4 hours, with stirring. After reaction, the contents of the autoclave were evaporated (30 mbars at ambient temperature). 250 ml of methanol was added to deprotect the alcohol function and it was stirred for two hours. The reaction medium was evaporated again and purification was carried out by dissolving in acetonitrile then precipitation with n-heptane. After vacuum drying (20° C., 10 mbar), 20 g of a colorless oligomer which was soluble in the usual solvents such as acetone or THF was obtained.

$^1$H NMR analysis indicated a P2/P3 ratio of 1.5 and SEC analysis indicated a Mn of 3100 g/mole.

2nd Step

The procedure of Example 6 was followed, using 18.6 g of the terpolymer prepared in step 1 in 55 ml of acetonitrile solvent and using 9.9 g of acrylic acid chloride (121 mmoles). After purifying twice by dissolving in acetone and precipitating from water, 10 g of functionalized oligomer was obtained.

NMR analysis showed the formation of acrylate functions, as did infrared analysis (1720 cm$^{-1}$, C=O, acrylate; 1676 cm$^{-1}$, C=C, acrylate; 802 cm$^{-1}$, C=C, acrylate). SEC analysis indicated a Mn of 4800 g/mole.

3rd Step 1.98 g of the polymer from the second step was dissolved in 15 ml of 1,1,2-trichloroethane with 0.11 g of DAROCUR 1173® photoinitiator. About 1 ml of this solution was deposited in an aluminum dish (5 cm diameter) then the solvent was evaporated off to prepare a film. This film was then exposed to UV. After 3 passages of 300 ms, the acrylate bands were observed to have disappeared under infrared analysis. The product obtained became insoluble in the usual solvents (acetone), indicating that the matrix had been cross-linked (cured).

A reference reaction carried out without photoinitiator showed that the oligomer did not cross-link, the acrylate bands were still present in the infrared spectrum and the product remained soluble in acetone after UV exposure.

Similarly, a control carried out on this polymer showed that the acrylate bands remained stable at 54° C. for 4 h. This clearly demonstrates that the polymer curs by photochemical initiation and not by a thermal method or by degradation.

EXAMPLE 8

A mixture comprising 50% by weight of the polymer from the first step of Example 7 above and 50% of trifluoroethyl acrylate as the reactive diluent was used. As a mixture, the two products formed a transparent liquid resin. This mixture was dissolved in 1,1,2-trichloroethane in the presence of the photoinitiator used in the third step of Example 7. After a single 300 ms passage under UV, curing was observed, which resulted in the disappearance of the acrylate bands in the infrared and insolubility of the product obtained after UV irradiation.

Once the terpolymer P had been obtained, for example using one of the examples described above, the two compositions C1 and C2 were prepared to produce a fiber in accordance with the invention.

Two different compositions were manufactured, comprising a commercial photo-initiator, the reactive terpolymer P of Example 7 above, and a reactive diluent composed of two monomers in different proportions depending on the composition, the two monomers being (D1) and (D2).

The photo-initiator could, for example, be a Δ-hydroxyketone (IRGACURE 184, DAROCUR 1173), a mono-acyl phosphine (DAROCUR TPO) or a bis-acyl phosphine (IRGACLURE 819).

D1 and D2 could be monomers having at least one acrylic, methacrylic, Δ-fluoroacrylic, Δ,E-difluoroacrylic or vinyl function comprising halogenated groups (fluorinated and chlorinated).

Table 2 below shows the constitution and properties of compositions C1 and C2 prepared by mixing the reactive terpolymer P of Example 7, the reactive diluent D1 being trifluoroethyl acrylate (the homopolymer of which has a refractive index of 1.407 at 20° C.) and the reactive diluent D2 being trifluoroethyl methacrylate (the homopolymer of which has a refractive index of 1.437 at 20° C.). The photo-initiator was from the bis-acyl phosphine class (BAPO-IRGACURE 819). The quantities are calculated for 700 grams of composition.

TABLE 2

| Composition | Quantity of D1 (g) | Quantity of D2 (g) | Quantity of P (g) | Refractive index at 20° C. |
|---|---|---|---|---|
| C1 | 110 | 30 | 560 | 1.4311 |
| C2 | 140 | 0 | 560 | 1.4252 |

It can be seen that the ratio, as a % by weight, of the terpolymer P to the sum of the constituents of each composition was constant, while in the reactive diluent the relative proportion, as a % by weight of D1 with respect to the sum of D1 and D2, varied from one composition to the other. This allowed the viscosity of the two compositions to be controlled by varying the refractive index of each of said compositions.

According to the method of the invention, the continuous index variation was created by active mixing of the two starting compositions C1 and C2. To this end, the method of the invention was implemented using a mixing means which could be a static or dynamic mixer. This implementation is explained in detail in EP-A-1 067 22 which is hereby incorporated by reference. No further details will be given here of the function of the static or dynamic mixer used in the method of the invention, and it will be sufficient simply to describe the method of the invention in its implementation using one of the static mixers described in EP-A-1 067 222.

FIG. 1 shows a highly diagrammatic cross section along a plane comprising a central axis X of a device for manufacturing an optical fiber in accordance with the method of the invention.

Device 10 comprises a static mixer 1. Compositions C1 and C2 of the table above were mixed therein.

Mixer 1 comprises two concentric cylinders 3 and 4 acting as reservoirs for compositions C1 and C2. Cylindrical chamber 8 of the mixer 1 acts as a reservoir 4 for the composition C2. Composition C1 with the higher refractive index is placed in the central reservoir 3.

Chamber 8 comprises an upper leak-proof closure 8d which comprises two respective inlets 8g and 8f that provide a controlled pressure in each of respective reservoirs 3 and 4, for example using two volumetric pumps (not shown). A controlled pressure can thus be applied to the two compositions C1 and C2 to obtain an identical flow if the two compositions C1 and C2 have the same viscosity. It is also possible, however, to apply different controlled pressures for the openings 8f and 8g, for example if a different flow for each composition C1 or C2 is desired in the case of two compositions C1 and C2 with different viscosities. The chamber 8 also comprises a zone 8e in which the two reservoirs 3 and 4 are concentric, isolated one from the other, and a zone 8a the upper limit of which is the bottom of the central reservoir 3 and the lower limit of which is the bottom of the peripheral reservoir 4. The zone 8a corresponds to a mixing zone for the two compositions C1 and C2 by the mixer 1, namely an assembly 2 of superimposed plates (2a, 2b) perforated with holes 12. The chamber 8 also comprises a conical zone 8b in which a homothetic variation of cross section occurs, and finally a graded zone 8c comprising a die 15, which provides the desired order of magnitude for the diameter of the graded index plastic optical fiber 6 obtained.

The die 15 is an attached part, which means that its grade can readily be changed without changing the mixer 1.

Zone 8a of the mixer 1 comprises at least two, and in this case seven, perforated plates (2a, 2b) superimposed one above the other. This assembly 2 of plates (2a, 2b) is placed at the lower end of the central reservoir 3 to ensure radial mixing of compositions C1 and C2. A mixture 5 is obtained in zone 8a which has a gradient of concentrations of compositions C1 and C2. The mixture 5 is formed because of the superimposition of the plates (2a, 2b). Each plate 2a (or 2b) comprises holes 12, generally disposed counter to one another from one plate 2a to a neighboring plate 2b (or from one plate 2b to a neighboring plate 2a). In the representation of FIG. 1, there are two types of plates, plates 2a, four in number, and plates 2b, three in number, each of plates 2a or 2b comprising approximately the same number of holes 12.

The mixture 5 obtained is brought to the graded die 15 of zone 8c of the chamber 8 via the conical zone 8b the upper limit of which is the lower end of the last plate 2a. This homothetic variation preserves the shape of the concentration variation of compositions C1 and C2.

At the outlet from the die 15, the filament obtained, which is a graded index plastic optical fiber, 6, is drawn by a capstan 10. In one embodiment, the plastic optical fiber 6 is cured by photo-curing using a source 7 of ultraviolet radiation (UV) into a polymerized plastic optical fiber 9. The plastic optical fiber 9 is then wound onto a bobbin 11 using the capstan 10. The diameter of the fiber 9 is given by the die 15, but it may be made thinner depending on the draw force produced by the capstan 10. Either plastic optical fiber 6 or 9 can be used as the finished product of the invention.

FIG. 2 shows a diagram of an index profile obtained for an optical fiber manufactured using the device of FIG. 1. The refractive index profile n of the optical fiber 6 of FIG. 1 is shown, and is practically smooth so that it forms a gradient which is parabolic in shape, a function of the distance r from the center of the fiber 6, which is on the axis X.

Clearly, the method of the invention is not limited to the implementations that have been described above.

It is possible to use any device that is suitable for producing active mixing as the device for carrying out the method, in particular but not exclusively the devices described in document EP-A-1 067 222.

Further, the above compositions and examples are given by way of indication only, and the scope of the invention encompasses modifying them provided that the terpolymer P retains the general characteristics mentioned above.

Finally, the scope of the invention encompasses replacing any means by any equivalent means.

The invention claimed is:

1. A method of manufacturing a graded index plastic optical fiber wherein the index varies continuously between the center and periphery of the fiber, from at least one polymer P and at least one reactive diluent D1, to allow the refractive index of said fiber to vary, said method comprising the steps of:

preparing two compositions with different refractive indices, the difference in refractive index between the two compositions being at least $5 \times 10^{-3}$, each comprising at least the polymer P, one of the compositions, termed the first composition, also comprising at least the reactive diluent D1, a radical polymerization initiator being present in at least one of the compositions;

active mixing of the two compositions to obtain a continuous variation in the refractive index of the optical fiber;

spinning the mixture;

curing the mixture to produce a cured optical fiber with a refractive index gradient, said method being characterized in that said polymer P is a terpolymer comprising at least three repeating units P1, P2 and P3 with the following general formulae:

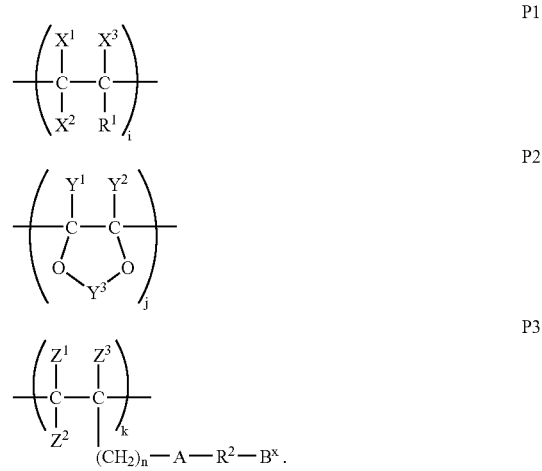

in which:

$X^1$, $X^2$ and $X^3$, which may be identical or different, are taken from the group of atoms H, F, Cl and Br;

$R^1$ is a H, F, Cl or Br atom or a carbonaceous group containing 1 to 10 partially or completely fluorinated carbon atoms;

$Y^1$ and $Y^2$, which may be identical or different, are taken either from the group of atoms comprising H, F, Cl and Br, or from the family of carbonaceous groups containing 1 to 10 carbon atoms;

$Y^3$ is a carbonyl group or a divalent carbonaceous group;

$Z^1$, $Z^2$ and $Z^3$, which may be identical or different, are hydrogen or fluorine atoms, or carbonaceous groups containing 1 to 10 carbon atoms;

n equals 0 or 1;

A is an ester function or an oxygen or sulfur atom;

$R^2$ is taken from the group comprising divalent hydrocarbon groups containing 2 to 8 carbon atoms and partially halogenated divalent carbonaceous groups containing 2 to 8 carbon atoms;

$B^x$ is an unsaturated reactive function;

i, j and k correspond to a repeat number of units;

the quantity of P3 units in the terpolymer being in the range 2 mole % to 40 mole %, preferably in the range 10% to 20%, and the mole ratio of the P1/P2 units being in the range 0.5 to 5.5, preferably in the range 1 to 2, said terpolymer being transparent, amorphous in nature and having a glass transition temperature (Tg) of more than 25° C.

2. A method according to claim 1, wherein said curing is photo-curing and in that said initiator is a photo-initiator.

3. A method according to claim 1, wherein the molar mass of the polymer P is in the range 1000 to 20000 g.moles$^{-1}$ and the molar mass of the reactive diluent D1 is in the range 100 to 1000 g.moles$^{-1}$.

4. A method according to claim 1, wherein polymer P and the reactive diluent D1 each comprise at least one UV-reactive unsaturated group selected from the group formed by vinyl groups and acrylic groups.

5. A method according to claim 1, wherein the glass transition temperature of said terpolymer is in the range 60° C. to 160° C.

6. A method according to claim 1, wherein the molar mass (Mn) of the terpolymer is in the range 500 to $10^6$ g.moles$^{-1}$.

7. A method according to claim 1, wherein the curing kinetics are such that, under maximum illumination and with complete transformation of the initiator, the gel time is less than 10 seconds.

8. A method according to claim 7, wherein the gel time is less than 2 seconds.

9. A method according to claim 1, wherein the second of said compositions comprises at least one reactive diluent D2 allowing its refractive index to be varied, the reactive diluent D2 having a substantially different refractive index from the refractive index of D1, having a molar mass in the range 100 to 1000 g.moles$^{-1}$ and comprising at least one UV-reactive unsaturated group selected from the group formed by vinyl groups and acrylic groups.

10. A method according to claim 9, wherein the viscosities of the reactive diluents D1 and D2 are practically identical and in that the proportion by weight of said polymer P with respect to the constituents of the composition is practically constant for each of said compositions.

11. A method according to claim 1, wherein the two compositions are mixed at a temperature such that the viscosity at 20° C. of each of said compositions is in the range 1 to 25 Pa.s.

12. A method according to claim 1, wherein spinning is carried out at a temperature such that the viscosity of each of the two compositions is more than 500 mPa.s.

13. A method according to claim 1, wherein every component of one of said compositions is an at least partially halogenated material.

14. A method according to claim 13, wherein when the reactive diluent D2 is present in the second of said compositions, one of the two reactive diluents D1 or D2 is at least partially fluorinated and the other of the two reactive diluents D2 or D1 is at least partially chlorinated or chlorofluorinated.

15. A graded index plastic optical fiber, obtained by the method according to any one of claims 1 to 14.

16. An optical waveguide, obtained by the method according to any one of claims 1 to 14.

* * * * *